United States Patent
Christenson et al.

(10) Patent No.: US 9,774,487 B2
(45) Date of Patent: *Sep. 26, 2017

(54) DUPLICATE IP ADDRESS DETECTION BY A DHCP RELAY AGENT

(71) Applicant: International Business Machines Corporation, Armonk, NY (US)

(72) Inventors: David A. Christenson, Fergus Falls, MN (US); James Venuto, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 13/709,221

(22) Filed: Dec. 10, 2012

(65) Prior Publication Data

US 2013/0166737 A1    Jun. 27, 2013

Related U.S. Application Data

(63) Continuation of application No. 13/334,105, filed on Dec. 22, 2011.

(51) Int. Cl.
  *H04L 29/08* (2006.01)
  *H04N 21/61* (2011.01)
  *H04L 29/14* (2006.01)
  *H04L 29/12* (2006.01)

(52) U.S. Cl.
  CPC .. *H04L 29/08099* (2013.01); *H04L 29/08072* (2013.01); *H04L 61/103* (2013.01); *H04L 61/2046* (2013.01); *H04L 69/40* (2013.01); *H04N 21/61* (2013.01); *H04L 61/2015* (2013.01)

(58) Field of Classification Search
  CPC ................................. H04L 69/40; G06F 15/16
  See application file for complete search history.

(56) References Cited

U.S. PATENT DOCUMENTS

| | | | |
|---|---|---|---|
| 6,374,295 | B2 | 4/2002 | Farrow et al. |
| 6,452,925 | B1 | 9/2002 | Sistanizadeh et al. |
| 6,654,891 | B1 | 11/2003 | Borsato et al. |
| 6,988,193 | B2 | 1/2006 | French et al. |
| 7,051,089 | B1 | 5/2006 | Johnson et al. |

(Continued)

FOREIGN PATENT DOCUMENTS

CN         101977245 A        2/2011

OTHER PUBLICATIONS

Droms, R. (Mar. 1997). IETF RFC 2131: Dynamic Host Configuration Protocol. Retrieved from <http://www.ietf.org/rfc/rfc2131.txt>.

(Continued)

*Primary Examiner* — Abdullahi E Salad
(74) *Attorney, Agent, or Firm* — Patterson + Sheridan, LLP

(57) ABSTRACT

Techniques are described for detecting duplicate IP addresses at a DHCP relay agent. Embodiments identify a list of DHCP clients that have valid IP address leases from one or more DHCP servers. Additionally, network traffic from a first node passing through the DHCP relay agent is monitored. Embodiments then determine whether the first node is using a duplicate IP address, based on the monitored network traffic and the identified list of DHCP clients.

12 Claims, 8 Drawing Sheets

(56) References Cited

U.S. PATENT DOCUMENTS

| | | | |
|---|---|---|---|
| 7,577,146 B2 | 8/2009 | Arberg et al. | |
| 7,596,615 B2 | 9/2009 | Satkunanathan et al. | |
| 7,711,826 B2 | 5/2010 | Ford | |
| 7,797,568 B2 | 9/2010 | Kubota | |
| 8,126,959 B2 | 2/2012 | Paul et al. | |
| 8,291,111 B1 | 10/2012 | Kinnear, Jr. et al. | |
| 8,495,208 B2 | 7/2013 | Hansson et al. | |
| 8,972,542 B2 | 3/2015 | Christenson et al. | |
| 8,984,106 B2 | 3/2015 | Christenson et al. | |
| 2003/0225864 A1* | 12/2003 | Gardiner | H04L 61/2015 709/220 |
| 2004/0148439 A1* | 7/2004 | Harvey et al. | 709/249 |
| 2005/0053222 A1* | 3/2005 | Lee et al. | 379/219 |
| 2005/0114492 A1 | 5/2005 | Arberg et al. | |
| 2005/0271049 A1 | 12/2005 | Jain et al. | |
| 2006/0218252 A1 | 9/2006 | Ford | |
| 2007/0214227 A1* | 9/2007 | Quinn | 709/206 |
| 2009/0132696 A1 | 5/2009 | Cankaya et al. | |
| 2009/0198800 A1* | 8/2009 | Dighe | H04L 29/12028 709/221 |
| 2009/0210518 A1 | 8/2009 | Verma et al. | |
| 2009/0307338 A1 | 12/2009 | Arberg et al. | |
| 2010/0082779 A1* | 4/2010 | Min | 709/220 |
| 2010/0191839 A1* | 7/2010 | Gandhewar et al. | 709/220 |
| 2010/0215019 A1* | 8/2010 | Velev et al. | 370/331 |
| 2010/0274924 A1* | 10/2010 | Allan et al. | 709/245 |
| 2011/0058482 A1 | 3/2011 | Nomura et al. | |
| 2013/0166707 A1 | 6/2013 | Christenson et al. | |

OTHER PUBLICATIONS

International Search Report and Written Opinion of the ISA dated May 2, 2013—International Application No. PCT/IB2012/057285.
U.S. Appl. No. 13/334,099, entitled "Extending a DHCP Relay to Backup a DHCP Server", filed Dec. 22, 2011.
U.S. Appl. No. 13/334,105, entitled "Duplicate IP Address Detection by a DHCP Relay Agent", filed Dec. 22, 2011.

* cited by examiner

DUPLICATE IP ADDRESS DETECTION BY A DHCP RELAY AGENT

CROSS-REFERENCE TO RELATED APPLICATIONS

This application is a continuation of co-pending U.S. patent application Ser. No. 13/334,105, filed Dec. 22, 2011. The aforementioned related patent application is herein incorporated by reference in its entirety.

BACKGROUND

Embodiments presented in this disclosure generally relate to computer networking and, more particularly, to techniques for identifying duplicate Internet Protocol (IP) addresses at a DHCP relay agent.

IP addresses are used to designate the destination of IP communications. An IP address serves a purpose for network communications similar to a street address for postal mail. In order for a device (or node) connected to an IP network to communicate over the network with another node through an Internet Protocol, each node must have an IP address and each node must reference the IP address of the other node. Further, each node must be configured such that it is capable of determining a route to each other node with which it wishes to communicate. The IP address configuration information can be used to determine routes to other nodes for the purposes of communication form an IP Configuration for a node.

There are several methods to provide a node on a network with an IP Configuration. A node new to the network or which has been set to a factory default state may have a well known default IP configuration. For example, such a node could come preconfigured to use an address on a non-routable network. Alternatively, the IP network may utilize a Dynamic Host Configuration Protocol ("DHCP") server. The DHCP server may have available a pool of IP addresses and may assign an address from the pool to the node for a session on the IP network. In this case, a DHCP Client on the node must be configured to accept an IP address from a DHCP server. As another alternative, some combination of DHCP and default configuration may be used to assign a node an IP Configuration.

Generally, DHCP gives network administrators a method to facilitate automatic distribution of addresses and to maintain the network configuration in a central location. More specifically, DHCP is an application-layer protocol that allows a client machine on a network to exchange packets between a software daemon on the client (i.e., a DHCP client) with another on a DHCP server (i.e., a DHCP server application) to get an IP address. The DHCP server may lease the IP address to clients for some period of time, after which the lease of the IP address will expire. In such a scenario, the DHCP clients may have the option of renewing the lease of the IP address for an additional period of time. Additionally, such a period of time may be an infinite timeframe, such that the assigned IP address for the client remains the same without requiring renewal.

SUMMARY

Embodiments described herein provide a method, system and computer program product for detecting duplicate IP addresses. The method, system and computer program product include identifying a list of DHCP clients that have valid IP address leases from one or more DHCP servers. Additionally, the method, system and computer program product include monitoring, at the DHCP relay agent, network traffic from a first node passing through the DHCP relay agent. The method, system and computer program product also include determining whether the first node is using a duplicate IP address, based on the monitored network traffic and the identified list of DHCP clients.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
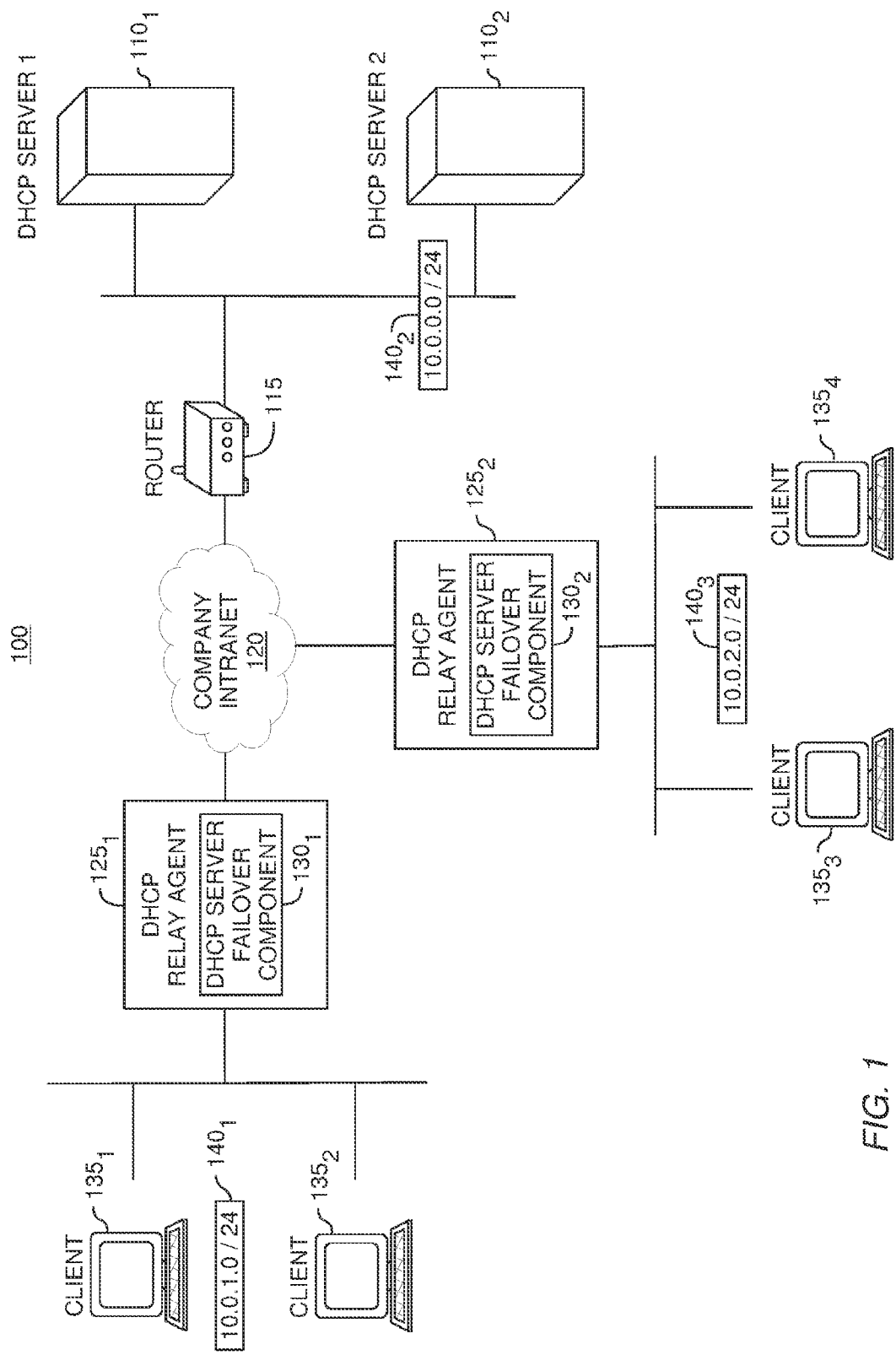
FIG. 1 is a diagram illustrating a system configured with a DHCP server failover component, according to one embodiment described herein.

Embodiments presented herein generally relate to techniques for configuring a DHCP relay agent to act as a backup DHCP server. FIG. 1 is a diagram illustrating a system configured with a DHCP server failover component, according to one embodiment described herein. As shown, the system 100 includes a plurality of DHCP clients $135_{1-4}$ located across two subnets $140_{1-3}$. Thus, in the depicted example, the DHCP clients $135_{1-2}$ are located on the subnet $140_1$ of 10.0.1.0/24 and the DHCP clients $135_{3-4}$ are located on the subnet $140_3$ of 10.0.2.0/24. The DHCP clients $135_{1-4}$ on the subnets $140_{1,3}$ are connected to a intranetwork 120 via DHCP relay agents $125_{1-2}$. Additionally, a plurality of DHCP servers $110_{1-2}$ are shown as located on a third subnet $140_2$ of 10.0.0.0/24. The DHCP servers $110_{1-2}$ are connected to the intranet 120 via a router 115.

Of note, in the depicted embodiment, the DHCP clients $135_{1-4}$ are located on different subnets from the DHCP servers $110_{1-2}$. As such, the DHCP clients $135_{1-4}$ may be unable to communicate directly with the DHCP servers $110_{1-2}$ in order to obtain leases on IP addresses. To accommodate for this, the DHCP relay agents $125_{1-2}$ are configured to relay DHCP-related traffic from devices on a first subnet to devices on a second, different subnet. For instance, the DHCP relay agents $125_{1-2}$ could be software that executes on a network device such as a router connected to both subnets. In the depicted embodiment, the DHCP relay agents $125_{1-2}$ are configured with a DHCP server failover component $130_{1-2}$.

The DHCP server failover components $130_{1-2}$ are configured to monitor DHCP-related traffic flowing through the DHCP relay agents $125_{1-2}$ and to collect lease data. Such lease data may indicate, for example, which IP addresses the DHCP servers $110_{1-2}$ have leased out and which of the DHCP clients $125_{1-4}$ these IP addresses are leased to. The DHCP server failover components $130_{1-2}$ may also retrieve DHCP server configuration information from the DHCP servers $110_{1-2}$. Such configuration information may specify, for instance, a range of IP addresses that each of the DHCP servers $110_{1-2}$ is configured to lease to clients. Additionally, each DHCP server failover component 130 is generally configured to monitor the DHCP servers $110_{1-2}$ and to determine when the DHCP servers $110_{1-2}$ have failed or otherwise become unavailable. For instance, such unavailability could be caused by a network problem in the company intranet 120 or in the router 115. As another example, the DHCP servers $110_{1-2}$ could be unavailable due to hardware malfunctions on the servers running the DHCP server applications. More generally, however, the DHCP server failover component 130 is configured to determine when the DHCP servers $110_{1-2}$ are unavailable for any reason.

Upon determining that the DHCP servers $110_{1-2}$ are unavailable, the DHCP server failover components $130_{1-2}$ may assume the role of a backup DHCP server, using the monitored lease data and the retrieved DHCP server configuration information. That is, each of the DHCP server failover components $130_{1-2}$ may begin servicing DHCP lease requests for clients $135_{1-4}$ on the respective subnet $140_{1-3}$. For example, upon detecting that both DHCP servers $110_{1-2}$ are unavailable, the DHCP server failover component $130_1$ could begin servicing DHCP requests for clients $135_{1,2}$ on the subnet $140_1$. Continuing the example, if the client $135_1$ then requests an IP address, the DHCP server failover component $130_1$ could service this request and assign an available IP address to the client $135_1$. Furthermore, the DHCP server failover component $130_1$ could use the retrieved DHCP server configuration information to determine the range of IP addresses that can be assigned to clients, and could further use the monitored lease data to determine which IP addresses are currently leased to clients. Based on this, the DHCP server failover component $130_1$ could select an available IP address and assign it to the client $135_1$.

At some point in time, the DHCP server failover component 130 could determine that the DHCP server $110_1$ has once again become available (e.g., once the problem in the company intranet 120 is resolved). Upon determining the DHCP server $110_1$ is available, the DHCP server failover component $130_1$ could transmit updated lease information to the DHCP server $110_1$. Such updated lease information could specify, for instance, which IP addresses the DHCP server failover component $130_1$ issued leases for and which clients these IP addresses were issued to. The DHCP server failover component 130 could resume relaying DHCP-related messages between the clients $135_{1,2}$ and the DHCP server $110_1$. Advantageously, doing so allows the DHCP relay agents $125_{1-2}$, each configured with a respective DHCP server failover component $130_{1-2}$, to assume the role of a backup DHCP and to service DHCP-related requests for the respective subnet $140_{1,3}$ in the event the DHCP servers $110_{1-2}$ become unavailable.

Figure 2:
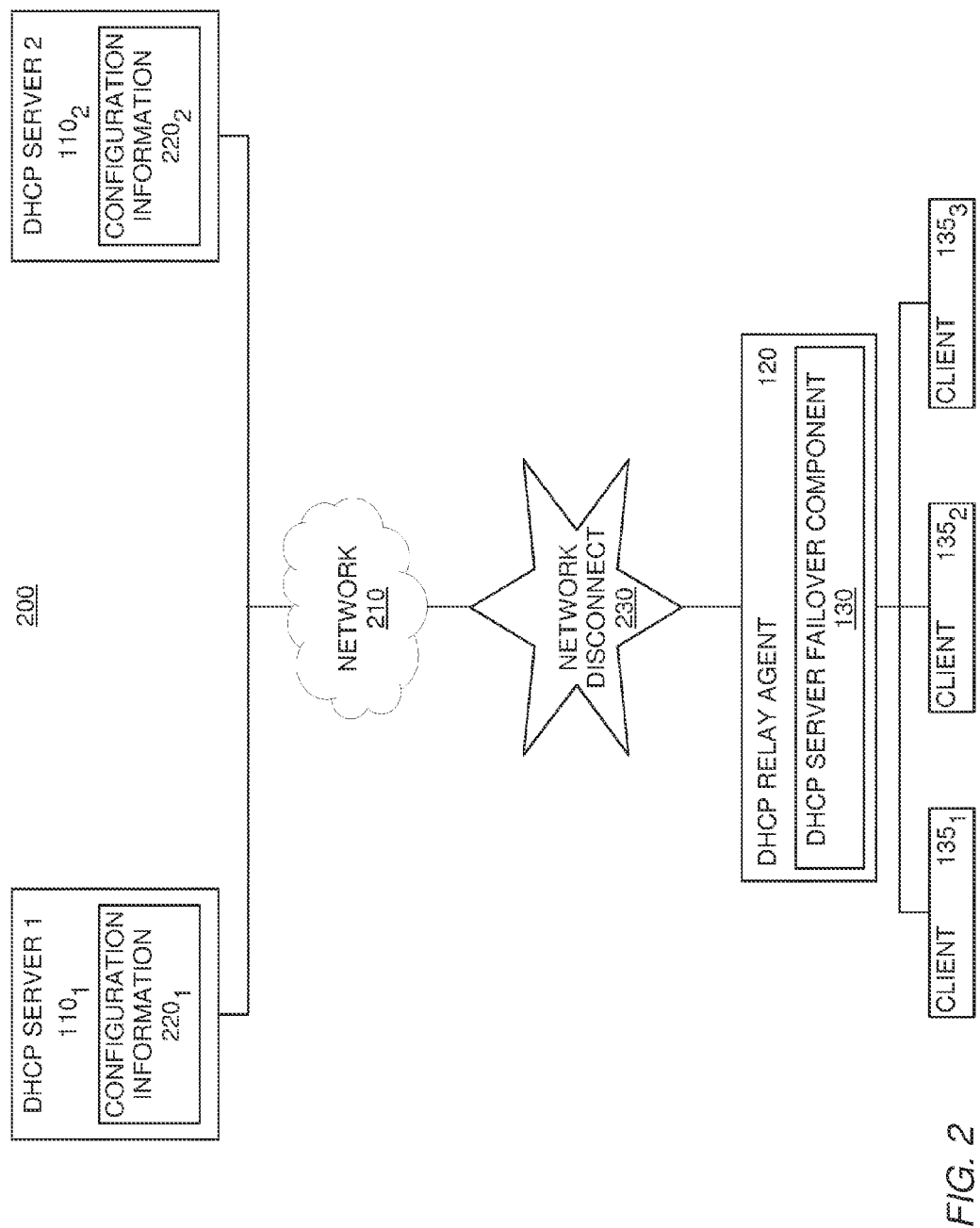
FIG. 2 is a diagram illustrating a system configured with a DHCP server failover component, according to one embodiment described herein.

FIG. 2 is a diagram illustrating a system configured with a DHCP server failover component, according to one embodiment described herein. As shown, the system 200 includes a plurality of DHCP servers $110_{1-2}$. Each DHCP server $110_{1-2}$ contains DHCP server configuration information $220_{1-2}$. Generally, the configuration information $220_{1-2}$ represents any data related to the configuration of the respective DHCP server $110_{1-2}$. For instance, such data could include a range of IP addresses to be dynamically assigned, a set of IP addresses that clients are currently leasing, which clients are currently leasing which IP address, the default duration of a new lease, the maximum lease duration, any static IP address configurations and so on. These examples are provided for illustrative purposes only and without limitation, and it is broadly contemplated that the configuration information $220_{1-2}$ represents any data associated with the configuration and/or status of the respective DHCP server $110_{1-2}$.

In the depicted system 200, the DHCP servers $110_{1-2}$ are connected to the network 210. Generally, the network 210 represents any form of computer network. Additionally, a DHCP relay agent 120 configured with a DHCP server failover component 130 is connected to the network 210. The DHCP relay agent is further connected to a plurality of clients $135_{1-3}$. For purposes of this example, assume that the DHCP servers $110_{1-2}$ are connected to a first subnet and the clients $135_{1-3}$ are connected to a second, different subnet. As discussed above, the DHCP relay agent 120 is generally configured to relay DHCP-related messages between the servers $110_{1-2}$ on the first subnet and the clients $135_{1-3}$ on the second subnet. Doing so allows clients on one or more subnets to access a DHCP server residing in a different subnet.

In the depicted embodiment, there is a network disconnect 230 between the DHCP relay agent 120 and the network 210. As a result, the DHCP relay agent 120 in the present example is unable to communicate with the DHCP servers $110_{1-2}$ over the network 210. In such a scenario, the DHCP server failover component 130 could detect that the DHCP servers $110_{1-2}$ are unavailable to service DHCP requests. For instance, the DHCP server failover component 130 could be configured to periodically attempt to communicate with the DHCP servers $110_{1-2}$ in a way that elicits a response from the servers $110_{1-2}$. In such a scenario, if the DHCP server failover component 130 does not receive the response from the DHCP servers $110_{1-2}$ within a predetermined period of time, the DHCP server failover component 130 could determine that the DHCP servers $110_{1-2}$ are currently unavailable.

Upon detecting that the DHCP servers $110_{1-2}$ are unavailable, the DHCP server failover component 130 could be configured to assume the role of a backup DHCP server for the clients $135_{1-3}$ on the subnet managed by the DHCP relay agent 120. As discussed above, the DHCP server failover component 130 could retrieve DHCP server configuration information from one or both of the DHCP servers $110_{1-2}$ and could further monitor DHCP-related traffic passing through the DHCP relay agent 120 between the DHCP servers $110_{1-2}$ and the clients $135_{1-3}$. The DHCP server failover component 130 could then use the DHCP server configuration information to determine a range of IP addresses that the DHCP servers $110_{1-2}$ are configured to assign IP addresses within and could further determine a set of already leased IP addresses based on the monitored DHCP-related traffic. Based on this, if the client $135_1$ were to then request an IP address, the DHCP server failover component 130 could select an IP address within the determined range of IP addresses that has not yet been leased to another client and could assign the selected IP address to the client $135_1$. Advantageously, doing so allows the DHCP server failover component 130 to function as a backup DHCP server in the event that the DHCP servers $110_{1-2}$ fail or otherwise become unavailable.

Figure 3:
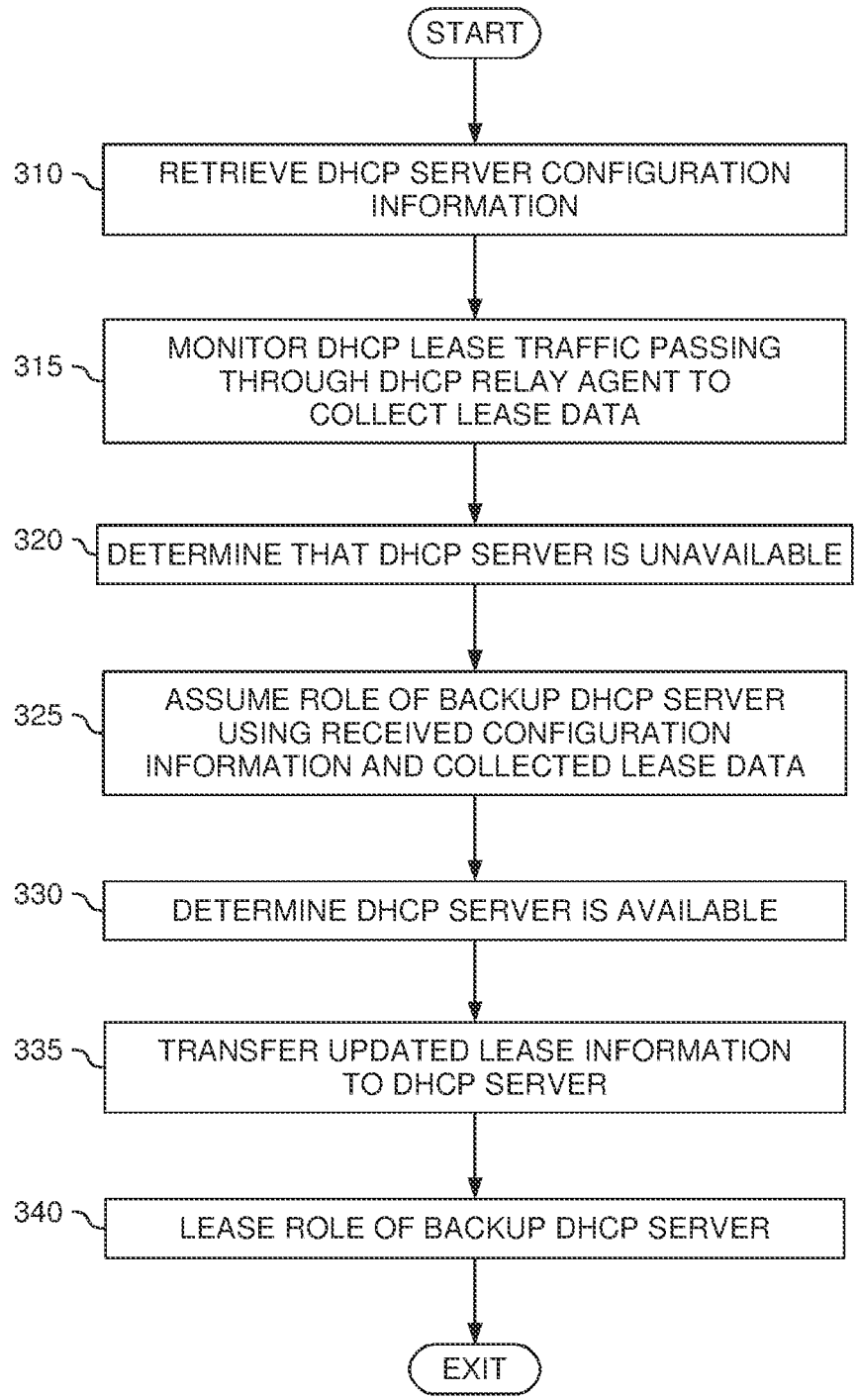
FIG. 3 is a flow diagram illustrating a method for providing a backup DHCP server, according to one embodiment described herein.

In one embodiment, the DHCP server failover component 130 may further be configured to monitor when one of the DHCP servers $110_{1-2}$ once again becomes available. For instance, in the depicted example, once the network disconnect 230 is resolved, the DHCP servers $110_{1-2}$ may once again become available for servicing DHCP requests. In such a scenario, the DHCP server failover component 130 could be configured to transmit updated lease data to the DHCP servers $110_{1-2}$, the updated lease data specifying IP addresses the DHCP server failover component 130 has leased out to clients while acting as a backup DHCP server. The DHCP servers $110_{1-2}$ could then use this updated lease data to update their own local lease data. The DHCP server failover component 130 could then cease its operations as a backup DHCP server and could resume relaying DHCP-related messages between the clients $135_{1-3}$ and the DHCP servers $110_{1-2}$. By doing this, the DHCP server failover component 130 ensures that the DHCP servers $110_{1-2}$ are accessing updated lease information when they resume operations FIG. 3 is a flow diagram illustrating a method for providing a backup DHCP server, according to one embodiment described herein. As shown, the method 300 begins at step 310, where the DHCP server failover component 130 retrieves DHCP server configuration information. Generally, the DHCP server configuration information specifies the setup of one or more DHCP servers on the network. For instance, the configuration information could specify a range of IP addresses that a DHCP server can lease out to DHCP clients. In one embodiment, the configuration information further specifies existing IP address leases by the DHCP server. Such information could include the specific IP addresses that the DHCP server has leased and which DHCP clients the IP addresses are leased to. The configuration information may further specify other configuration parameters of the DHCP server, such as a default lease time, a maximum lease time, static IP addresses the DHCP server should assign to particular devices (e.g., a printer), and so on. Of course, these examples are provided without limitation and for illustrative purposes. More generally, the DHCP server configuration information represents any data related to the setup of a DHCP server.

In retrieving the configuration information, the DHCP server failover component 130 may be configured to transmit a request to one or more DHCP servers requesting the configuration information. In response to such a request, the DHCP servers could be configured to transmit the DHCP server configuration information to the DHCP server failover component 130. In one embodiment, the DHCP server failover component 130 is configured to remotely access one or more of the DHCP servers to retrieve the DHCP server configuration information. For instance, the DHCP server failover component 130 could be preconfigured with credentials information that can be used to remotely access the configuration information on the DHCP server. In another embodiment, the DHCP server failover component 130 may be preconfigured (e.g., by a network administrator) with the DHCP server configuration information.

The DHCP server failover component 130 then monitors DHCP lease traffic between one or more DHCP servers and one or more DHCP clients passing through the DHCP server failover component 130 (step 315). The DHCP server failover component 130 collects lease data based on the monitored traffic. For instance, the DHCP server failover component 130 could be configured to track which IP addresses each DHCP server has leased out and to which client each IP address was leased. Additionally, the DHCP server failover component 130 could maintain information such as the time the DHCP server leased out each IP address.

This monitoring may continue until, at some point, the DHCP server failover component 130 determines that the one or more DHCP servers are unavailable (step 320). That is, the DHCP server failover component 130 determines a DHCP server is unavailable when the DHCP server failover component 130 is unable to contact the DHCP server. As one of ordinary skill in the art will appreciate, the DHCP servers could be unavailable for any number of reasons. As an example, a computer system that a DHCP server application is running on could experience a hardware failure. As another example, the network connection between the DHCP server failover component 130 and the DHCP server could be experiencing problems that cause the DHCP server failover component 130 to be unable to contact the DHCP server. More generally, however, it is broadly contemplated that the DHCP server could be unavailable for any reason preventing the DHCP server failover component 130 from contacting the DHCP server.

Upon determining the DHCP server is unavailable, the DHCP server failover component 130 assumes the role of a backup DHCP server using the received configuration information and the lease data collected from monitoring the DHCP lease traffic (step 325). For instance, the DHCP server failover component 130 could use the DHCP server configuration information to determine a range of IPs that are available for leasing and could use the lease data collected from monitoring the DHCP lease traffic to determine which IP addresses have already been leased out to DHCP clients. Based on this information, the DHCP server failover component 130 could begin servicing lease requests from DHCP clients, using the IP addresses specified in the DHCP server configuration information that have not yet been leased out to a client.

For example, the retrieved DHCP server configuration information could specify that the DHCP server is configured to lease IP addresses in the range of 192.168.0.1 through 192.168.0.100. Additionally, by monitoring the lease traffic flowing past the DHCP server failover component 130, the DHCP server failover component 130 could determine that the DHCP server has already leased out the IP addresses in the range of 192.168.0.1 through 192.168.0.50. Thus, in such an example, upon assuming the role of the backup DHCP server, the DHCP server failover component 130 could service subsequent requests for IP addresses from DHCP clients using the IP addresses in the range of 192.168.0.51 through 192.168.0.100. Advantageously, doing so avoids assigning out any duplicate IP addresses to two or more of the DHCP clients while still using IP addresses in the originally specified range.

The DHCP server failover component 130 may continue servicing requests for IP addresses as a backup DHCP server until, at some later point in time, the DHCP server failover component 130 determines that one or more of the DHCP servers are once again available (step 330). The DHCP server failover component 130 then transfers updated lease information to the available DHCP server (step 335). Such updated lease information could include, for instance, which IP addresses the DHCP server failover component 130 has leased out to DHCP clients while acting as the backup DHCP server. The lease information could further include which DHCP clients the IP addresses were leased to (e.g., specified using a MAC address of the client) and the time at which the IP address was leased. Once the updated lease information is transmitted to the DHCP server, the DHCP server failover component 130 ceases acting as a backup DHCP server and resumes the role of a relay agent between the two subnets (step 340), and the method 300 ends.

Figure 4A:
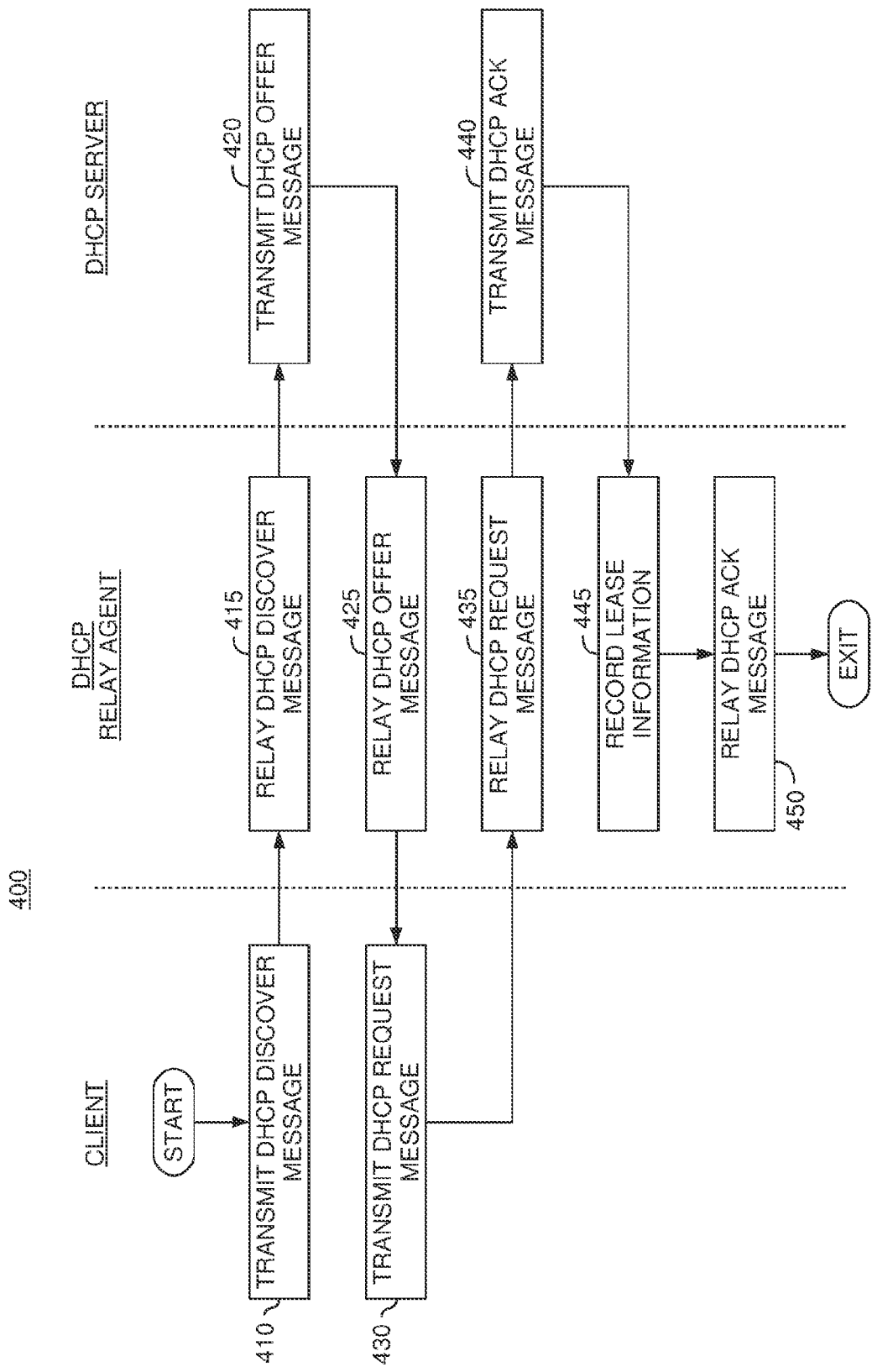
FIGS. 4A-B are flow diagrams illustrating methods for monitoring DHCP lease traffic, according to embodiments described herein.
Figure 4B:
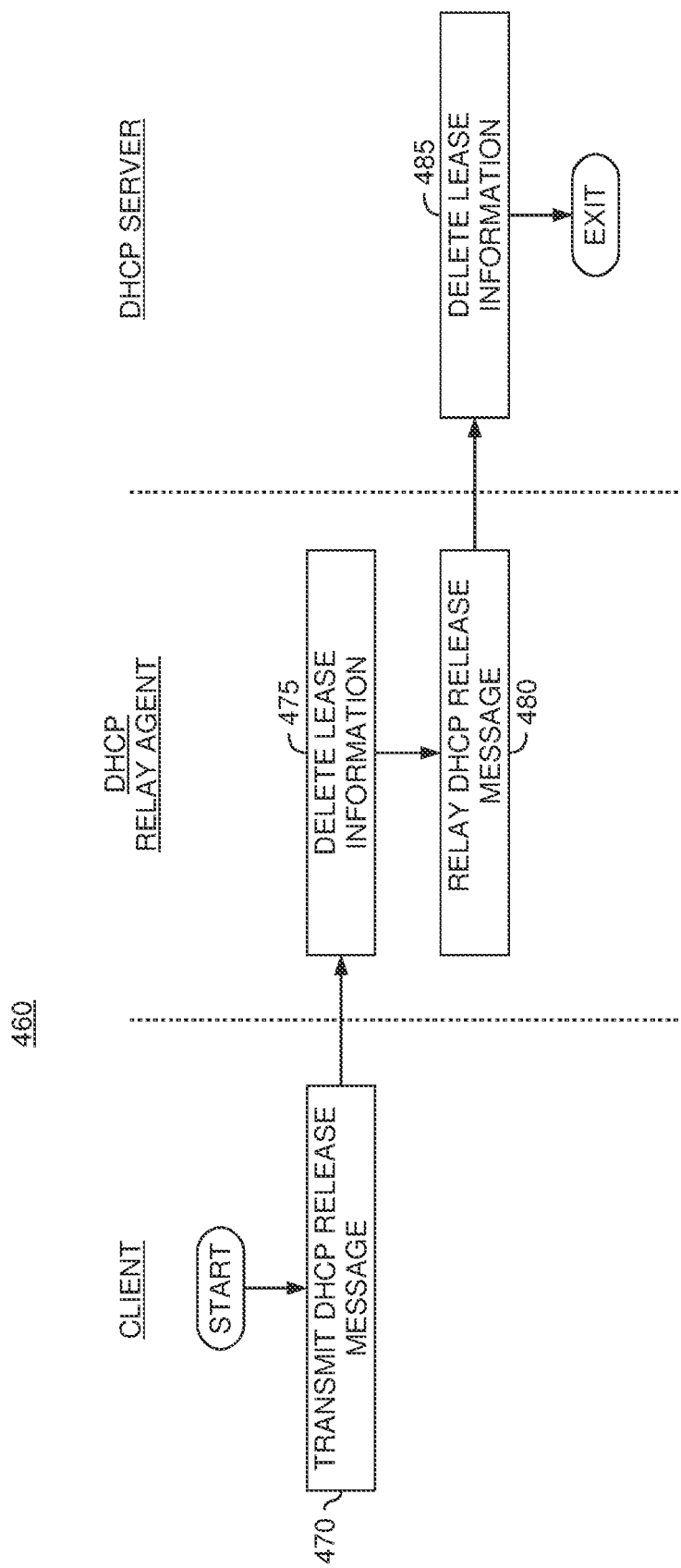

FIGS. 4A-B are flow diagrams illustrating methods for monitoring DHCP lease traffic, according to embodiments described herein. As discussed above, particular embodiments presented herein relate to a network architecture in which DHCP clients are located on a separate subnet from the DHCP server and where a DHCP relay agent is configured to transmit messages between the DHCP clients and DHCP server across the different subnets. For purposes of FIGS. 4A-B, assume that the depicted methods occur in such an environment. As shown in FIG. 4A, the method 400 begins at step 410, where a DHCP client transmits a DHCPDISCOVER message. The DHCP server failover component 130 receives the DHCPDISCOVER message from the client on a first subnet and relays this message to the DHCP server on a second, different subnet (step 415). Responsive to receiving the DHCPDISCOVER message, the DHCP server transmits a DHCPOFFER message (step 420). The DHCP server failover component 130 then receives the DHCPOFFER message from the server on the second subnet and relays this message to the client on the first subnet (step 425).

Upon receiving the DHCPOFFER message, the DHCP client determines to accept the offered IP address and transmits a DHCPREQUEST message (step 430). Again the DHCP server failover component 130 relays the message between the client on the first subnet and the server on the second subnet (step 435). The DHCP server receives the DHCPREQUEST message and transmits a DHCPACK message in response, confirming the lease of the IP address to the DHCP client (step 440). At this point, upon receiving the DHCPACK message, the DHCP server failover component 130 records lease information indicating that the IP address has been assigned to the DHCP client (step 445). That is, because the lease of the IP address to the client has been confirmed, the DHCP server failover component 130 is configured to record this information for subsequent use should the DHCP server failover component 130 assume the role of a backup DHCP server. For example, assume the DHCP server offered the IP address of 192.168.0.50 to the DHCP client and the client accepted this offer. In such an example, the DHCP server failover component 130 could record the lease of the IP address, so that if the DHCP server failover component 130 assumes the role of a backup DHCP server, the DHCP server failover component 130 can avoid leasing out the IP address of 192.168.0.50 to a different DHCP client and creating a duplicate IP address problem. Upon recording the lease information, the DHCP server failover component 130 relays the DHCPACK message to the DHCP client on the first subnet (step 450), and the method 400 ends.

FIG. 4B illustrates a method for monitoring DHCP lease traffic, according to one embodiment presented herein. As shown, the method 460 begins at step 470, where a DHCP client on a first subnet transmits a DHCPRELEASE message, indicating that the DHCP client is releasing the IP address that it is currently leasing. Upon receiving the DHCPRELEASE message, the DHCP server failover component 130 deletes its lease information regarding the released IP address (step 475). That is, since the IP address has been released, the DHCP server failover component 130 is free to lease this IP address to another DHCP client, should the DHCP server failover component 130 assume the role of a backup DHCP server. Thus, in the depicted example, the DHCP server failover component 130 deletes its locally maintained lease information regarding this IP address, indicating that the IP address is once again available for leasing to DHCP clients. The DHCP server failover component 130 then relays the DHCPRELEASE message from the DHCP client on the first subnet to the DHCP server on the second, different subnet (step 480. Upon receiving the DHCPRELEASE message, the DHCP server also deletes its lease information regarding the DHCP client and the released IP address (step 485) and the method 460 ends.

Figure 5:
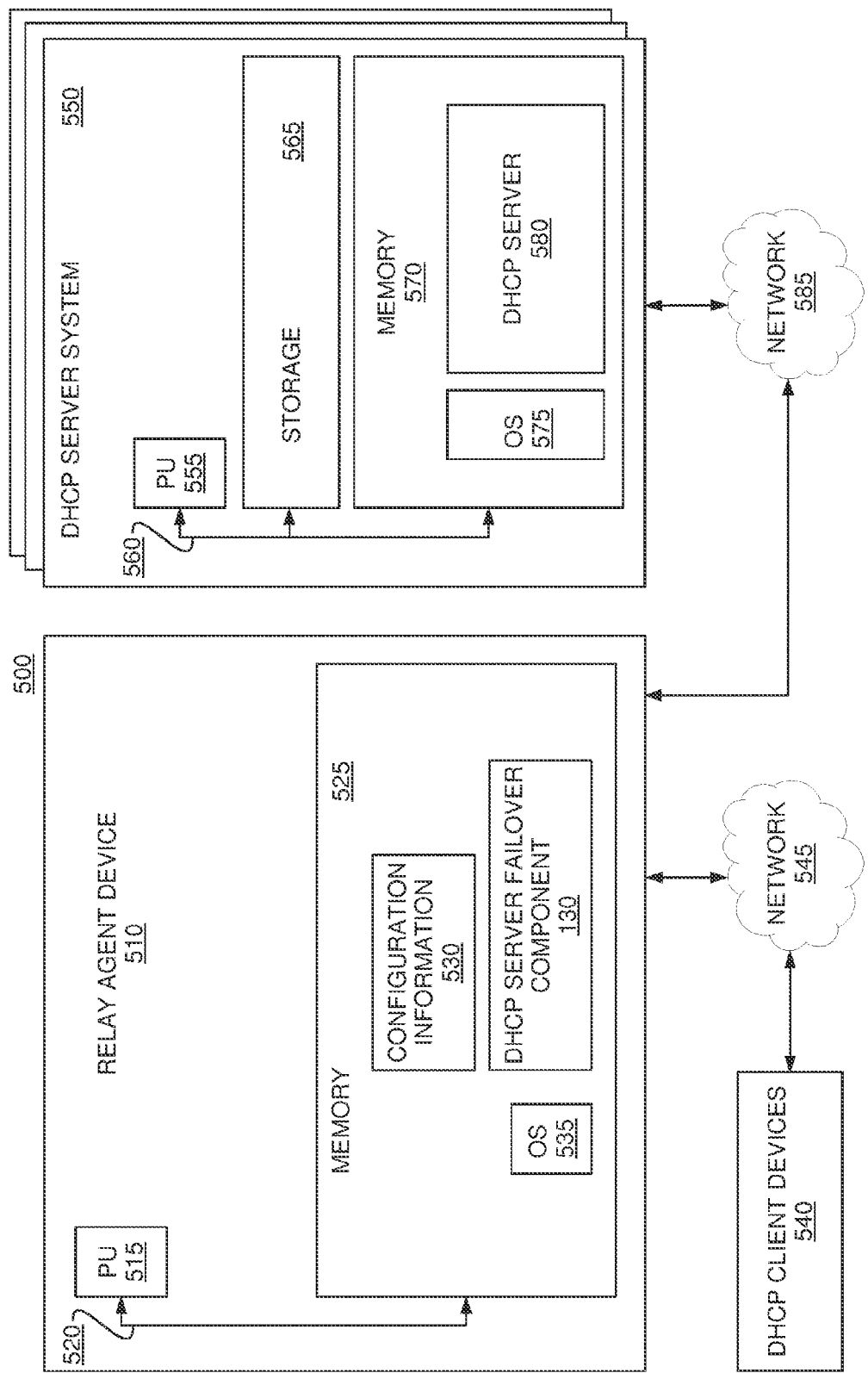
FIG. 5 is a block diagram illustrating a system configured with a DHCP server failover component, according to one embodiment described herein.

FIG. 5 is a block diagram illustrating a system configured with a DHCP server failover component, according to one embodiment described herein. As shown, the system 500 includes a relay agent device 510, a plurality of and a plurality of DHCP server systems 550, communicatively coupled via a network 585. In one embodiment, the relay agent device 510 represents an existing system, e.g., network devices (i.e., routers, switches, etc.), desktop computers, server computers, laptop computers, and the like. The relay agent device 510 illustrated in FIG. 5, however, is merely an example of a system in which embodiments of the present invention may be used. Embodiments of the present invention may be implemented differently, regardless of whether the computer system is a complex multi-user computing system, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, the relay agent device 510 includes, without limitation, a processor 515, which obtains instructions and data via a bus 520 from a memory 525. Processor 515 is a programmable logic device that performs instruction, logic, and mathematical processing, and may be representative of one or more CPUs. The relay agent device 510 is operably connected to the network 545 and the network 585, e.g., via network interfaces.

The memory 525 is any memory sufficiently large to hold the necessary programs and data structures. Memory 525 could be one or a combination of memory devices, including Random Access Memory, nonvolatile or backup memory (e.g., programmable or Flash memories, read-only memories, etc.). In addition, memory 525 may be considered to include memory physically located elsewhere; for example, on another computer coupled to the relay agent device 510 via bus 520. The memory 525 includes a DHCP server failover component 140 and an operating system ("OS") 535. Operating system 535 is software used for managing the operation of the relay agent device 510. Examples of OS 535 include UNIX, versions of the Microsoft Windows® operating system and distributions of the Linux® operating system. (Note: Linux is a trademark of Linus Torvalds in the United States and other countries.) More generally, any operating system 535 capable of performing the functions described herein may be used.

As shown, the relay agent device 510 is communicatively connected to the DHCP client devices 540 via the network 545. The DHCP client devices 540 broadly represent any system or device that can be configured with a DHCP client (i.e., software or firmware that is capable of accepting an IP address from a DHCP server). Generally, the relay agent 510 is configured to transmit DHCP-related messages from the DHCP client devices 540 residing on a first subnet to the DHCP server systems 550 residing on a second, different subnet.

Each DHCP server system 550 in the depicted embodiment includes, without limitation, a processor 555, which obtains instructions and data via a bus 560 from a memory 570 and storage 565. Processor 555 is a programmable logic device that performs instruction, logic, and mathematical processing, and may be representative of one or more CPUs. Storage 565 is representative of hard-disk drives, flash memory devices, optical media and the like. Generally, the storage 565 stores application programs and data for use by the DHCP server system 550. The DHCP server system 550 is operably connected to the network 590, e.g., via a network interface.

The memory 570 is any memory sufficiently large to hold the necessary programs and data structures. Memory 570 could be one or a combination of memory devices, including Random Access Memory, nonvolatile or backup memory (e.g., programmable or Flash memories, read-only memories, etc.). In addition, memory 570 and storage 565 may be considered to include memory physically located elsewhere; for example, on another computer coupled to the DHCP server system 550 via bus 560. The memory 570 includes a DHCP server application 580 and an OS 575. Operating system 575 is software used for managing the operation of the DHCP server system 550. Examples of OS 575 include UNIX, versions of the Microsoft Windows® operating system and distributions of the Linux® operating system. More generally, any operating system 575 capable of performing the functions described herein may be used.

As discussed above, the DHCP server failover component 130 may monitor DHCP-related traffic flowing through the respective relay agent device 510 between the DHCP client devices 540 and the DHCP server systems. Based on this, the DHCP server failover component 130 could determine, for instance, a number of current IP address leases for each of the DHCP servers 580. The DHCP server failover component 130 can also retrieve DHCP server configuration information for the DHCP servers 580, specifying configuration characteristics such as a range of IP addresses a particular DHCP server 580 is configured to lease out, lease duration, maximum lease duration, and so on. The DHCP server failover component 130 may then determine that the DHCP servers 580 have become unavailable (e.g., due to a problem in the network 585). In such a situation, the DHCP server failover component 130 could assume the role of a DHCP server for the DHCP client devices 540, providing leases on IP addresses to the clients 540 using the retrieved DHCP server configuration information and based on the monitored DHCP-related traffic.

Duplicate IP Address Detection

Figure 6:
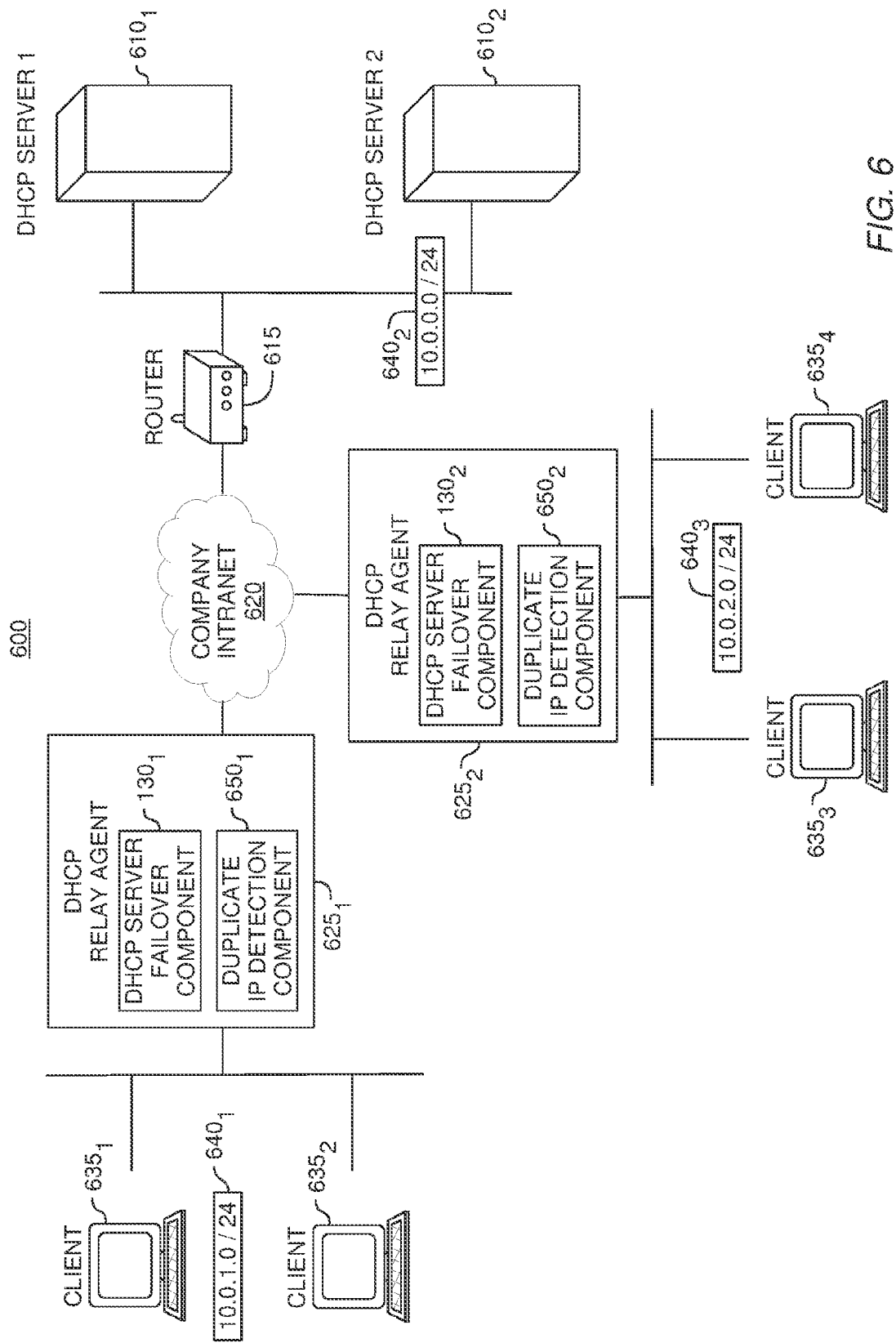
FIG. 6 is a block diagram illustrating a system configured with a duplicate IP detection component, according to one embodiment described herein.

In one embodiment, a DHCP relay agent can be configured with a duplicate IP detection component that is configured to detect clients using duplicate IP addresses. FIG. 6 is a block diagram illustrating a system configured with a duplicate IP detection component, according to one embodiment described herein. As shown, the system 600 includes a plurality of DHCP clients $635_{1-4}$ located across two subnets $640_{1,3}$. Thus, in the depicted example, the DHCP clients $635_{1-2}$ are located on the subnet $640_1$ of 10.0.1.0/24 and the DHCP clients $635_{3-4}$ are located on the subnet $640_2$ of 10.0.2.0/24. The DHCP clients $635_{1-4}$ on the subnets $640_{1,3}$ are connected to a company intranetwork 620 via DHCP relay agents $625_{1-2}$. Additionally, a plurality of DHCP servers $610_{1-2}$ are shown as located on a third subnet $640_2$ of 10.0.0.0/24. The DHCP servers $610_{1-2}$ are connected to the company intranet 620 via a router 615.

Similar to as discussed above, in the depicted embodiment, the DHCP clients $635_{1-4}$ are located on different subnets from the DHCP servers $610_{1-2}$. As such, the DHCP clients $635_{1-4}$ may be unable to communicate directly with the DHCP servers $610_{1-2}$ in order to obtain leases on IP addresses. To accommodate for this, the DHCP relay agents $625_{1-2}$ are configured to relay DHCP-related traffic from devices on a first subnet to devices on a second, different subnet. In the depicted embodiment, the DHCP relay agents $625_{1-2}$ are configured with a DHCP server failover component $130_{1-2}$ and a duplicate IP detection component $650_{1-2}$.

As discussed above, the DHCP server failover components $130_{1-2}$ may generally be configured to assume the role of a backup DHCP server in the event the DHCP servers $610_{1-2}$ become unavailable. Additionally, the duplicate IP detection component 650 is generally configured to detect devices within the corresponding subnet that are using duplicate IP addresses. Upon detecting two or more devices using a duplicate IP address, the duplicate IP detection component 650 could determine one of the devices that is authorized to use the IP address and could perform a corrective action with regard to the remaining, unauthorized devices using the duplicate IP address.

For instance, the duplicate IP detection component 650 could maintain a list of IP addresses that have been leased out by the DHCP servers and an identifier for a client to which each respective IP address is leased. The duplicate IP detection component 650 could determine such a list by, for instance, retrieving DHCP server configuration information that specifies a range of IP addresses from a DHCP server. The duplicate IP detection component 650 could then monitor network traffic passing through the DHCP relay agent to detect when two clients are using the same IP address. For example, the duplicate IP detection component 650 could inspect network frames passing through the DHCP relay agent to determine the IP address and an identifier (e.g., a Media Access Control (MAC) address) of the device sending the frame. The duplicate IP detection component 650 could then compare the determined IP address and identifier to the maintained list of IP addresses to determine whether the device sending the network frame has obtained a valid lease on its IP address.

Of note, the traffic monitored by the duplicate IP detection component 650 may include both IP packets and ARP packets. If the duplicate IP detection component 650 detects that an unauthorized client broadcasts an ARP reply or announcement containing an unauthorized IP address, the duplicate IP detection component 650 can be configured to not update its ARP cache based on the detected ARP reply. That is, since updating the ARP cache based on the ARP reply specifying the unauthorized IP address would cause the ARP cache entry from the authorized client to be overlaid, the duplicate IP detection component 650 can be configured to avoid updating its ARP cache based on such unauthorized ARP messages. The duplicate IP detection component 650 may also be configured to broadcast an ARP announcement on behalf of the authorized client to correct any client ARP caches that may have been contaminated by the ARP announcement transmitted by the unauthorized client. Advantageously, doing so ensures that the clients on the subnet do not inadvertently connect to the unauthorized client as a result of a contaminated ARP cache caused by the unauthorized client broadcasting an ARP reply or announcement.

As an example, assume that the duplicate IP detection component $650_1$ maintains a list of IP addresses which specifies that the IP address "10.0.1.1" is associated with the client $635_1$ having a MAC address of "AA:AA:AA:BB:BB:BB". If the duplicate IP detection component $650_1$ then detects a network frame flowing through the DHCP relay agent $625_1$ sent from client $635_2$ also having the IP address "10.0.1.1" but the MAC address of "AA:AA:AA:CC:CC:CC", the duplicate IP detection component $650_1$ could determine that a duplicate IP address problem exists. That is, because the IP address has been leased to the client $635_1$ having a first MAC address and the second client $635_2$ with a second, different MAC address is also using the IP address, the duplicate IP detection component $650_1$ could determine that two different clients $635_{1,2}$ on the subnet $640_1$ are using the same IP address. Additionally, the duplicate IP detection component $650_1$ could be configured to determine which of these client devices $635_{1,2}$ is authorized to use the IP address. For instance, the duplicate IP detection component $650_1$ could determine that the client device $635_1$ on the maintained list of leased IP addresses is the authorized device and that any other device using the IP address is an unauthorized device. Thus, in this example, the duplicate IP detection component $650_1$ could determine that the client $635_2$ having the MAC address of "AA:AA:AA:CC:CC:CC" is not authorized to use the IP address "10.0.1.1".

Upon detecting the unauthorized client $635_2$ using a duplicate IP address, the duplicate IP detection component $650_1$ could be configured to perform a corrective action. For instance, the duplicate IP detection component $650_1$ could generate a notification identifying the duplicate IP address and the unauthorized device (e.g., the client device's $635_2$ MAC address) and transmit the generated notification to a network administrator. The duplicate IP detection component $650_1$ could also be configured to drop all network frames received from the unauthorized client device $635_2$. Advantageously, doing so prevents the unauthorized client device $635_2$ using the duplicate IP address from interfering with the authorized client device $635_1$ which holds a valid lease on the IP address.

In one embodiment, the duplicate IP detection component $650_1$ is configured to determine when an unauthorized device is using an IP address that creates a potential duplicate IP address conflict. Such a potential conflict exists, for instance, when the unauthorized device is using an IP address for which it does not hold a valid lease, the IP address is within the range of IP addresses the DHCP servers $610_{1-2}$ are configured to assign IP addresses from, and the DHCP servers $610_{1-2}$ are not currently leasing the IP address out to another device. In such a situation, although no duplicate IP address conflict currently exists, a potential conflict still exists because the DHCP servers $610_{1-2}$ are unaware of the unauthorized device using the IP address and thus may lease the IP address to another client at any time, thereby creating a duplicate IP address conflict. Upon detecting such a potential conflict exists, the duplicate IP detection component $650_1$ could be configured to drop all network frames received from the unauthorized device.

In a particular embodiment, upon determining that a potential duplicate IP address conflict exists, the duplicate IP detection component 650 is configured to request an IP address on behalf of the unauthorized client from an available DHCP server. For example, assume that the client $635_3$ is using the IP address "10.0.2.50". Further, assume that the DHCP server $610_1$ is configured to assign IP addresses for the subnet $640_1$ within the range of "10.0.2.1" through "10.0.2.150", but that the DHCP server $610_1$ has not yet leased the IP address "10.0.2.50" to any clients. In such an example, the duplicate IP detection component $650_1$ could determine that a potential duplicate IP address conflict exists because the client $635_3$ is using an IP address for which it does not hold a current lease and because the IP address is within the range of IP addresses the DHCP server $610_1$ is configured to lease to clients. Upon determining the potential conflict exists, the duplicate IP detection component $650_1$ could transmit a message to the DHCP server $610_1$ requesting a lease of the IP address "10.0.2.50" and specifying the MAC address of the client $635_3$ as the identifier for the client leasing the MAC address. Advantageously, doing so resolves the potential duplicate IP address conflict by obtaining a valid lease on the IP address for the unauthorized client and ensures that the DHCP server $610_1$ will not lease the IP address "10.0.2.50" out to a different client (e.g., client $635_4$) and create an actual duplicate IP address conflict.

Figure 7:
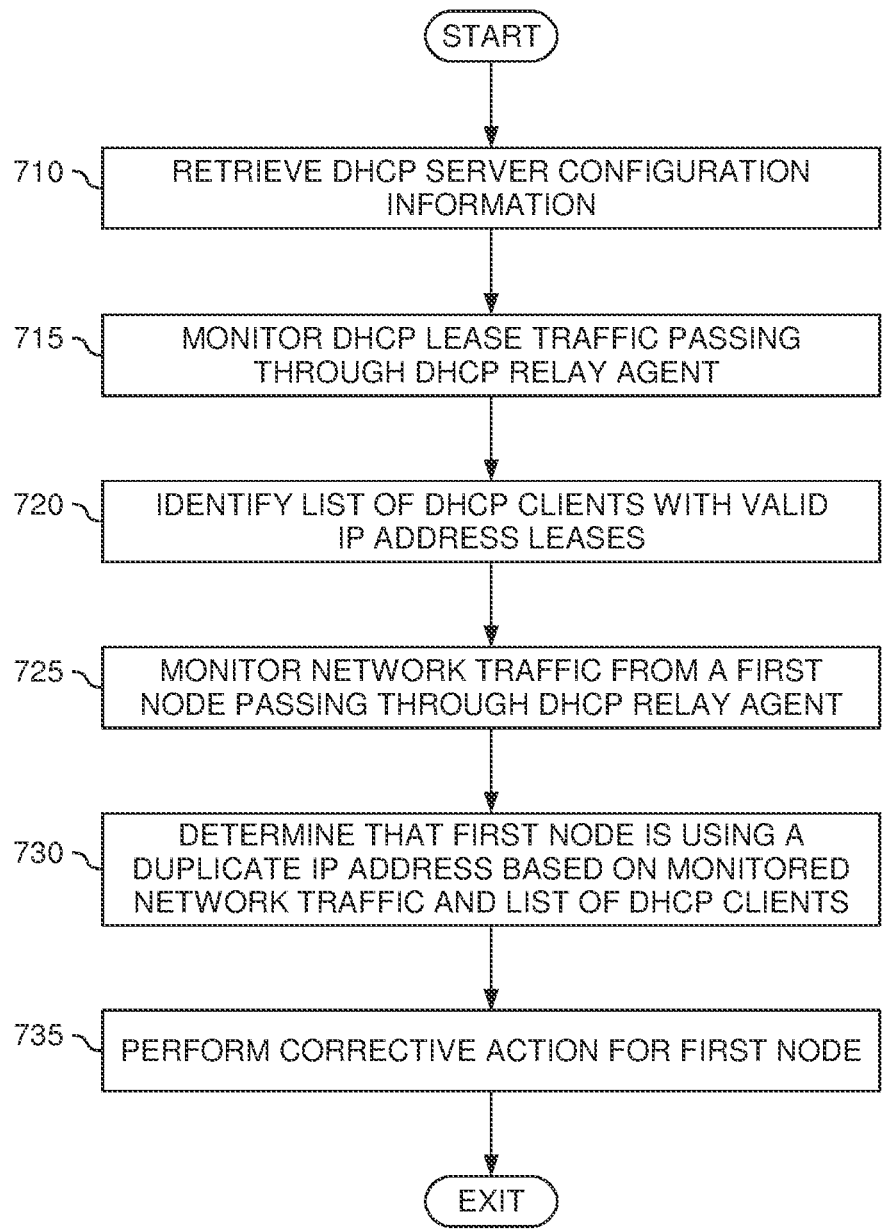
FIG. 7 is a flow diagram illustrating a method for detecting duplicate IP addresses, according to one embodiment described herein.

FIG. 7 is a flow diagram illustrating a method for detecting duplicate IP addresses, according to one embodiment described herein. As shown, the method 700 begins at step 710 where the duplicate IP detection component 650 retrieves DHCP server configuration information for one or more DHCP servers. As discussed above, the DHCP server configuration information generally specifies information relating to the configuration of the DHCP servers, which may include a range of IP addresses the DHCP servers are configured to lease out. To retrieve this information, the duplicate IP detection component 650 could transmit a request to the one or more DHCP servers requesting transmission of the DHCP server configuration information. As another example, the duplicate IP detection component 650 could be configured to remotely access the DHCP server configuration information on the DHCP servers. In yet another embodiment, the duplicate IP detection component 650 could be preconfigured with the configuration information and could locally access this information.

The duplicate IP detection component 650 then monitors DHCP lease traffic passing through the DHCP relay agent on which the duplicate IP detection component 650 is located (step 715). The duplicate IP detection component 650 then identifies a list of DHCP clients with valid IP address leases (step 720). That is, by monitoring the DHCP lease traffic, the duplicate IP detection component 650 could maintain a list of current IP address leases and a list of identifying the clients to which each leased IP address is assigned. For instance, upon detecting that a first client has obtained a lease on a first IP address, the duplicate IP detection component 650 could be configured to add the first IP address to the list along with an identifier (e.g., a MAC address) for the first client. As another example, upon detecting that a second client has released its lease on a second IP address, the duplicate IP detection component 650 could remove the second IP address and an identifier for the second client from the list.

Additionally, the duplicate IP detection component 650 is configured to monitor network traffic from a first node passing through the DHCP relay agent (step 725). As part of such monitoring, the duplicate IP detection component 650 could be configured to inspect network frames passing through the DHCP relay agent on which the duplicate IP detection component 650 resides to determine an IP address and a MAC address of the device sending the network frame. The duplicate IP detection component 650 could then determine whether any DHCP clients on the identified list of DHCP clients have a valid lease on the determined IP address and, if so, could compare the determined MAC address with the MAC of the DHCP client holding the valid lease. If these MAC addresses match, the duplicate IP detection component 650 could determine that the network frame was sent by the authorized client and that no duplicate IP address conflict exists with respect to the current network frame.

However, in the depicted example, the duplicate IP detection component 650 compares these MAC addresses and determines that the first node is using a duplicate IP address because the MAC addresses are not the same (step 730). Upon determining that a duplicate IP address conflict exists, the duplicate IP detection component 650 performs a corrective action for the first node (step 735) and the method 700 ends. As discussed above, examples of such a corrective action include, without limitation, generating a notification to a network administrator and dropping all network frames received by the first node (i.e., the node using the duplicate IP address without a valid lease on the IP address).

Additionally, in one embodiment, the duplicate IP detection component 650 could determine that although no duplicate IP address conflict exists, a potential duplicate IP address conflict does exist. That is, the duplicate IP detection component 650 could determine that although no authorized client device currently holds a lease on the IP address the first node is using without a valid lease, the DHCP server(s) for the subnet are configured such that the server(s) could lease the IP address to another client device. In such an example, the duplicate IP detection component 650 may perform a remedial action based on the detected potential duplicate IP address conflict. For instance, as with an actual duplicate IP address conflict, the duplicate IP detection component 650 could be configured to generate a notification to a network administrator and/or drop all network frames received from the client device using the IP address without a valid lease. In one embodiment, the duplicate IP detection component 650 is configured to request a lease on the IP address from the DHCP server(s) on behalf of the unauthorized client device. Advantageously, such an embodiment ensures that the unauthorized client device does not create a duplicate IP address conflict, while still allowing the unauthorized client device to continue using the IP address.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the cloud resources could be communicatively coupled across multiple subnets and a DHCP relay agent configured with a duplicate IP detection component 650 could reside between two of these subnets. In such an example, the duplicate IP detection component 650 could detect when two cloud resources on the corresponding subnet attempt to use the same IP address and could perform a corrective action to prevent a duplicate IP address conflict from arising. Doing so helps to ensure proper operation of the cloud resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
upon determining, by a Dynamic Host Configuration Protocol (DHCP) relay agent positioned in a network between DHCP clients and one or more DHCP servers, that the one or more servers have become unavailable, assigning a first IP address to a first DHCP client of the DHCP clients;
upon determining that the one or more DHCP servers are available, identifying, at the DHCP relay agent, a list of DHCP clients that have valid IP address leases from the one or more DHCP servers;
monitoring, at the DHCP relay agent, network traffic originating from the DHCP clients and passing through the DHCP relay agent; and
determining, at the DHCP relay agent, that the first DHCP client is using the first IP address that creates a potential duplicate IP address conflict, when the identified list of DHCP clients indicates that the first DHCP client does not have a valid lease for the first IP address and when the monitored network traffic indicates that no other device within the network is currently using the first IP address; and
performing a corrective action for the potential duplicate IP address conflict, comprising:
transmitting, at the DHCP relay agent, a request for a lease of the first IP address and that specifies a media access control (MAC) address of the first DHCP client, to one of the one or more DHCP servers, thereby resolving the potential duplicate IP address conflict without involvement of the first DHCP client.

2. The method of claim 1, wherein identifying the list of DHCP clients that have valid IP address leases further comprising:
retrieving DHCP server configuration information specifying a configuration of one or more DHCP servers; and
monitoring, at a DHCP relay agent, DHCP lease traffic between the one or more DHCP servers and one or more DHCP clients passing through the DHCP relay agent to collect DHCP lease data.

3. The method of claim 1, further comprising:
upon determining that the first DHCP client is using a duplicate IP address, generating a notification identifying the first DHCP client and the duplicate IP address.

4. The method of claim 1, further comprising:
upon determining that the first DHCP client is using a duplicate IP address, dropping, at the DHCP relay agent, all subsequent packets received from the first DHCP client.

5. The method of claim 1, wherein the corrective action comprises dropping, at the DHCP relay agent, all subsequent packets received from the first DHCP client.

6. The method of claim 1, wherein the one or more DHCP servers are located on a first subnet, wherein the one or more DHCP clients are located on a second subnet that is different from the first subnet, and wherein the DHCP relay agent is configured to relay traffic between the first subnet and the second subnet.

7. The method of claim 1, further comprising:
transmitting an ARP announcement on behalf of one of the DHCP clients in the list of DHCP clients having valid IP address leases, wherein at least one entity on the subnet is configured to update an ARP cache based on the transmitted ARP announcement.

8. The method of claim 1, further comprising:
upon detecting that the first DHCP client has obtained a lease on a first IP address, adding the IP address and the associated MAC address of the first client to the identified DHCP client list; and
upon detecting that a second DHCP client has released a second IP address, removing the IP address and a MAC address associated with the second client from the identified DHCP client list.

9. The method of claim 1, wherein monitoring the network traffic further comprises:
receiving an address resolution protocol (ARP) request from a second DHCP client of the DHCP clients;
upon determining that the second DHCP client having a second IP address has a valid IP address, updating an ARP cache on the DHCP relay agent based on the received ARP request; and
upon determining that the second DHCP client does not have a valid IP address:
avoiding any update operation to the ARP cache on the DHCP relay agent based on the received ARP request; and
forwarding a second ARP request on behalf of an authorized DHCP client, the authorized DHCP client being assigned the second IP address, to correct one or more other ARP caches.

10. The method of claim 1, wherein monitoring the network traffic includes monitoring at least one of IP packets and ARP packets, and further comprises:
detecting a first ARP announcement on behalf of one of the DHCP clients in the list of DHCP clients having a valid IP address passing through the DHCP relay agent; and
in response, broadcasting a second ARP announcement on behalf of the DHCP client having a valid IP address to correct at one or more ARP caches that have been contaminated by the ARP announcement transmitted by a DHCP client having an invalid IP address.

11. The method of claim 1, wherein the first DHCP client is using a first IP address, and wherein determining whether the first DHCP client is using a duplicate IP address further comprises:
comparing a MAC address corresponding to the first DHCP client with a MAC address corresponding to the first IP address, to determine whether the first DHCP client has a valid lease for the first IP address.

12. The method of claim 1, wherein the DHCP relay agent is positioned between the DHCP clients and a plurality of DHCP servers inclusive of the one or more DHCP servers, and wherein each of the plurality of DHCP servers is located on a respective distinct subnet.

\* \* \* \* \*